United States Patent [19]
Sherwood et al.

[11] Patent Number: 5,260,850
[45] Date of Patent: Nov. 9, 1993

[54] LOGIC MODULE ASSEMBLY FOR CONFINING AND DIRECTING THE FLOW OF COOLING FLUID

[75] Inventors: Gregory J. Sherwood; Chris M. Quaderer, both of Colorado Springs, Colo.

[73] Assignee: Cray Computer Corporation, Colorado Springs, Colo.

[21] Appl. No.: 813,966

[22] Filed: Dec. 24, 1991

Related U.S. Application Data

[63] Continuation-in-part of Ser. No. 666,362, Mar. 8, 1991, Pat. No. 5,131,233.

[51] Int. Cl.⁵ .............................................. H05K 7/20
[52] U.S. Cl. .................... 361/689; 62/259.2; 165/104.33; 257/714; 361/699; 439/485
[58] Field of Search ............. 62/64, , 259.2, 415–418, 62/; 165/80.3, 80.4, 908, 911, 104.33, 104.34; 357/82; 361/382, 383, 385–389, 396, 407, 412, 393, 413, 394, 414, 395, 415, 429; 439/45–48, 75, 65, 485; 257/707, 712–714

[56] References Cited

U.S. PATENT DOCUMENTS

| | | |
|---|---|---|
| 4,590,538 | 5/1986 | Cray et al. . |
| 5,014,419 | 5/1991 | Cray et al. . |
| 5,045,975 | 9/1991 | Cray et al. . |
| 5,054,192 | 10/1991 | Cray et al. . |
| 5,063,475 | 11/1991 | Balan .................................. 361/384 |
| 5,112,232 | 5/1992 | Cray et al. ............................ 439/75 |
| 5,131,233 | 7/1992 | Cray et al. ............................... 62/64 |

*Primary Examiner*—Gerald P. Tolin
*Attorney, Agent, or Firm*—John R. Ley

[57] ABSTRACT

An improved logic module comprises integrated circuit chips located in channels. The channels convey a flow of a cooling fluid or a combination of cooling fluids, bringing the cooling fluid into contact with the integrated circuit chips. Flow blockers and power blades form boundaries of the channels and substantially exclude the undesirable entry or exit of cooling fluids at the boundaries. A support frame holds the logic modules of a cluster of logic modules in a generally parallel relationship. Sealing plates between logic modules and an assembly gasket substantially prevent flow short circuiting. The power blades mate sealably with a horizontal buss to conduct electric power to the module.

36 Claims, 7 Drawing Sheets

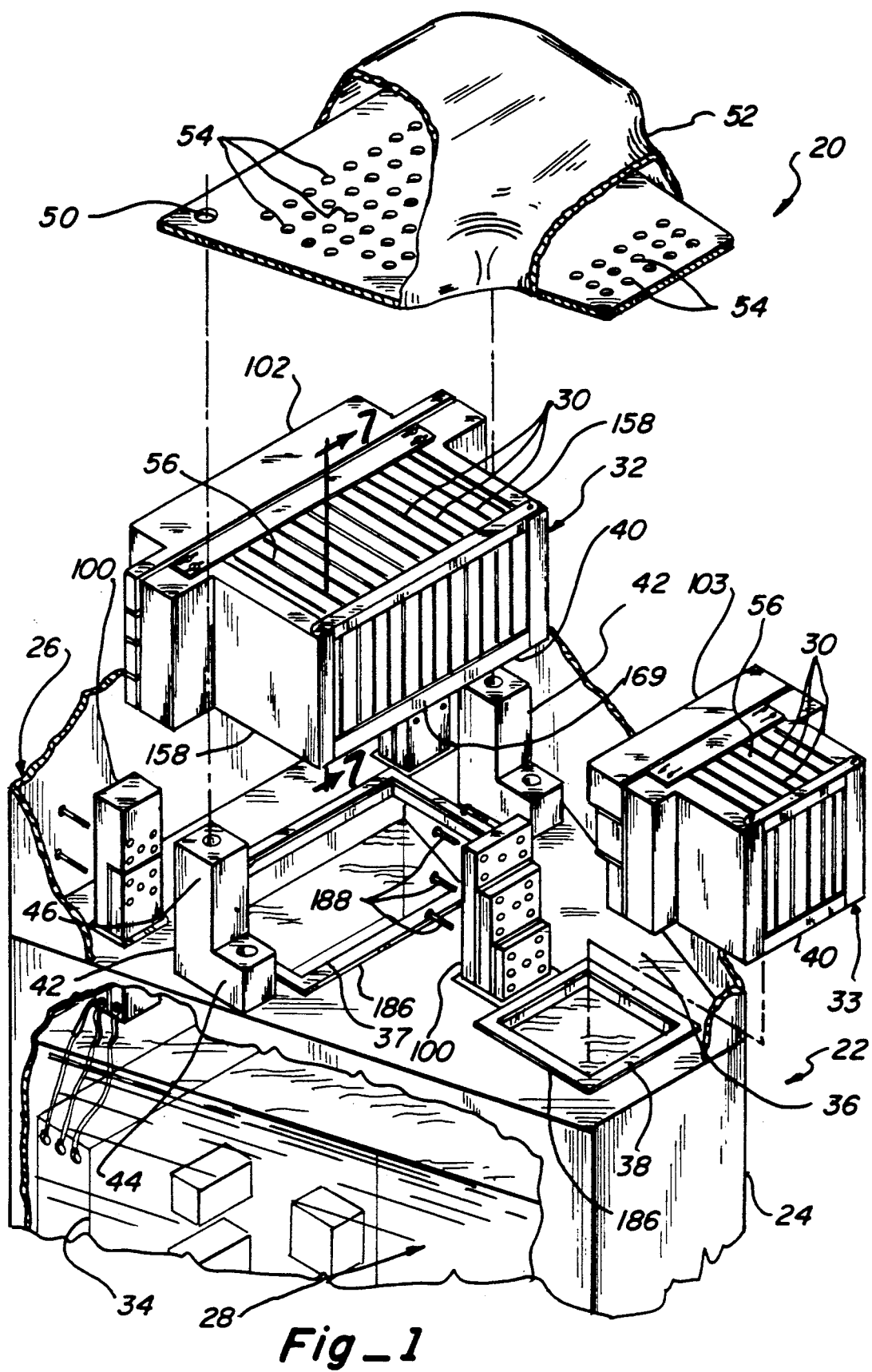
Fig_1

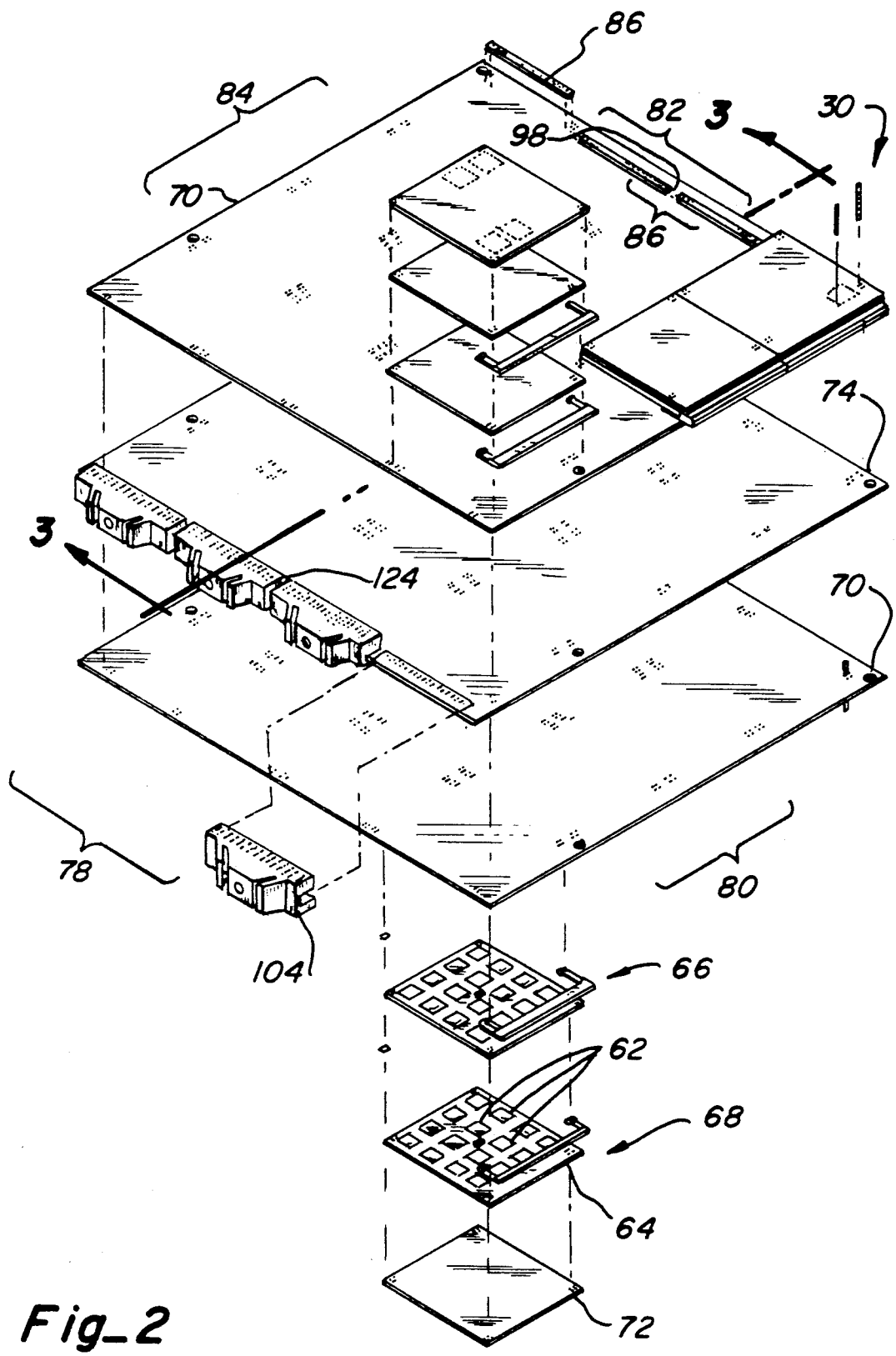
Fig_2

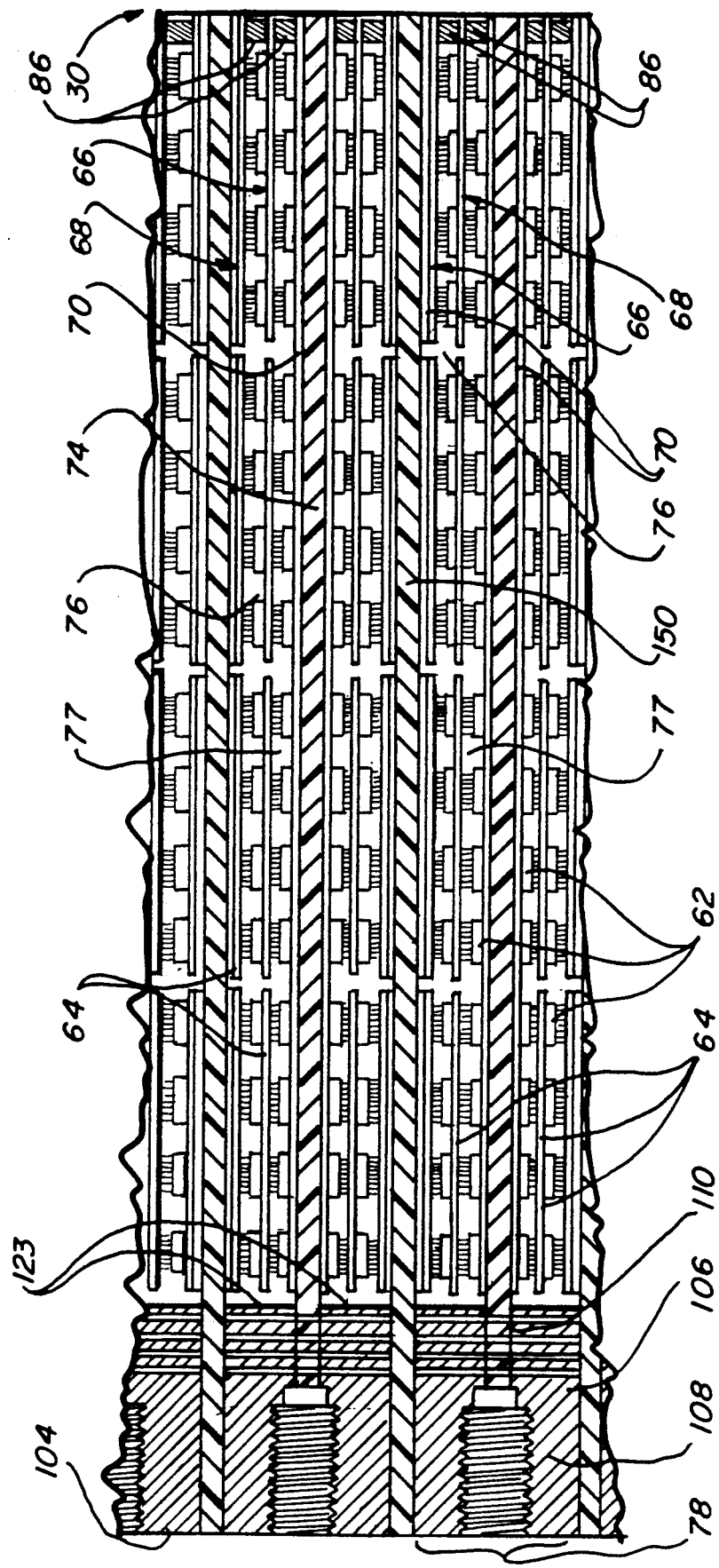
Fig_3

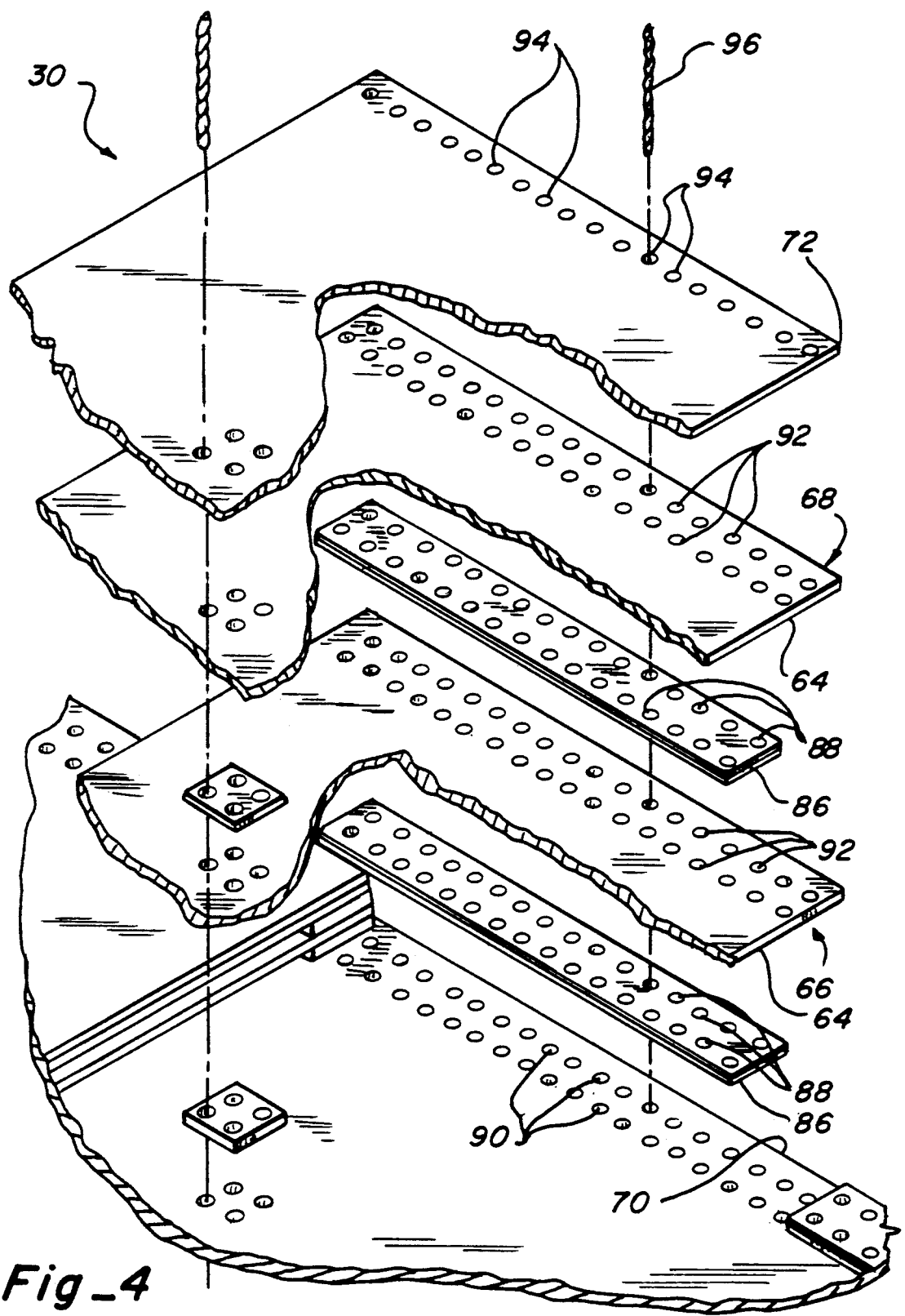
Fig_4

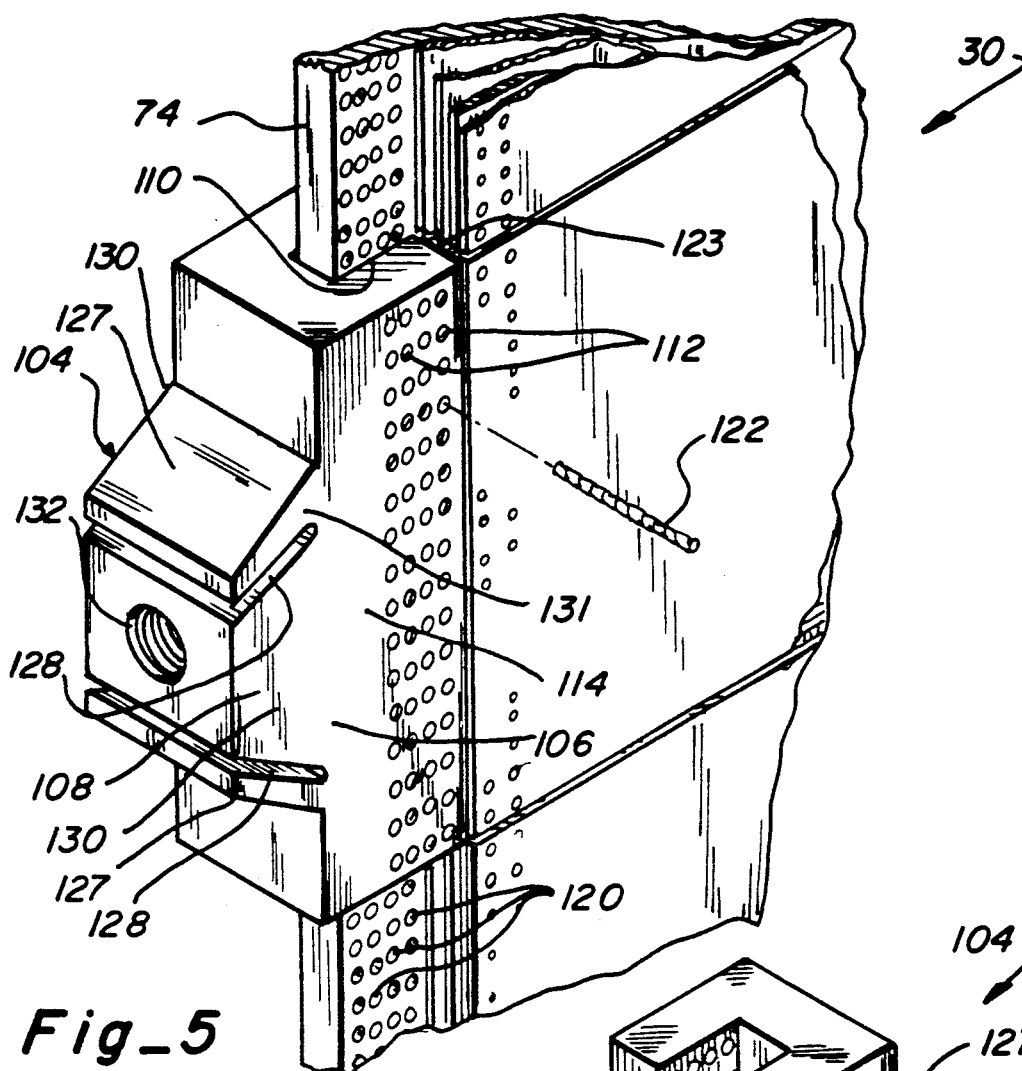
Fig_5
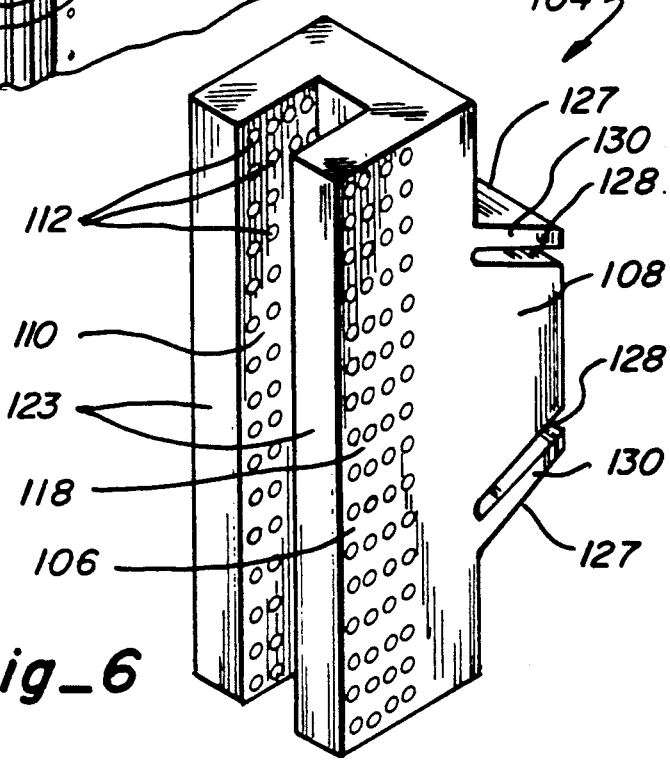
Fig_6

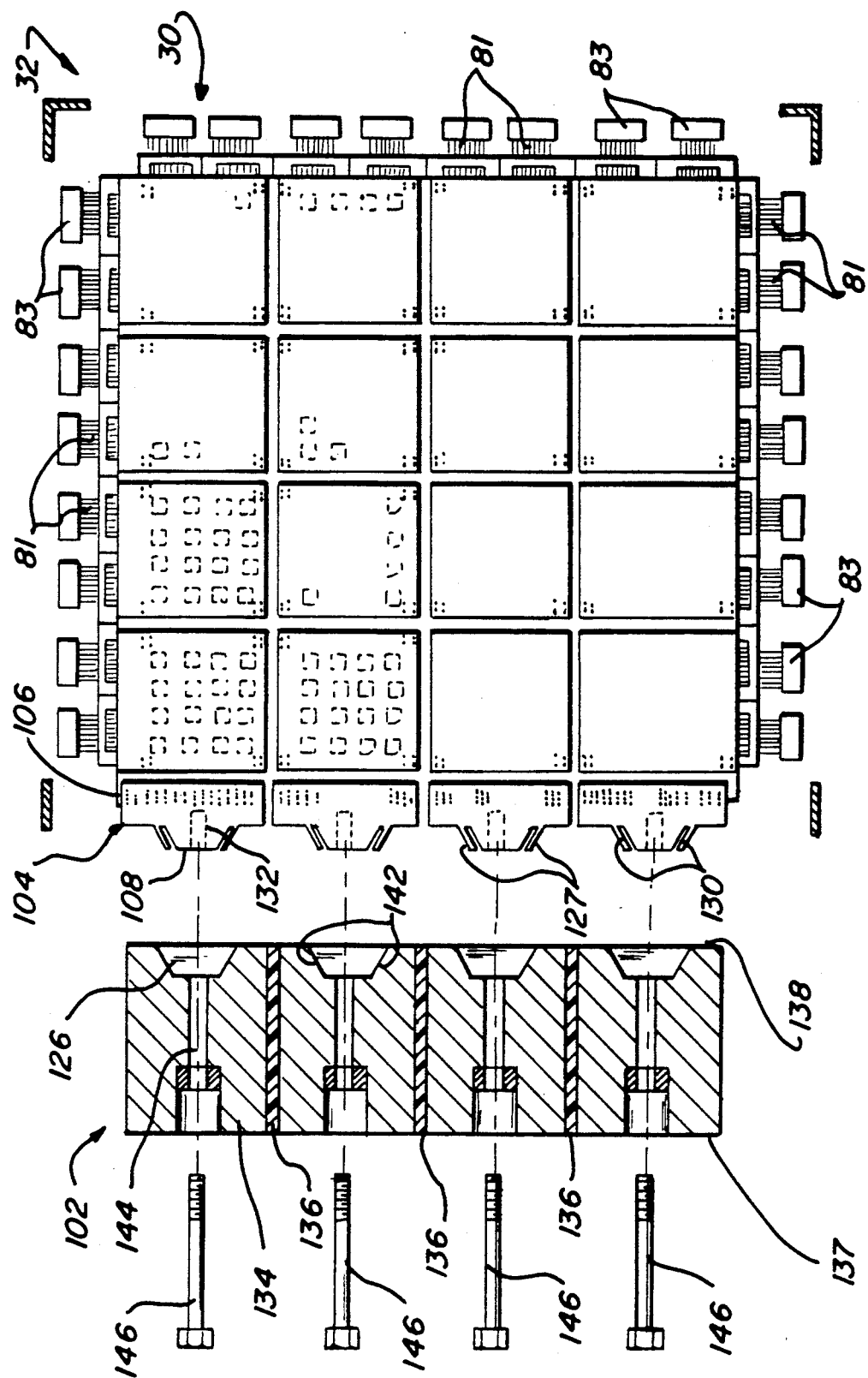

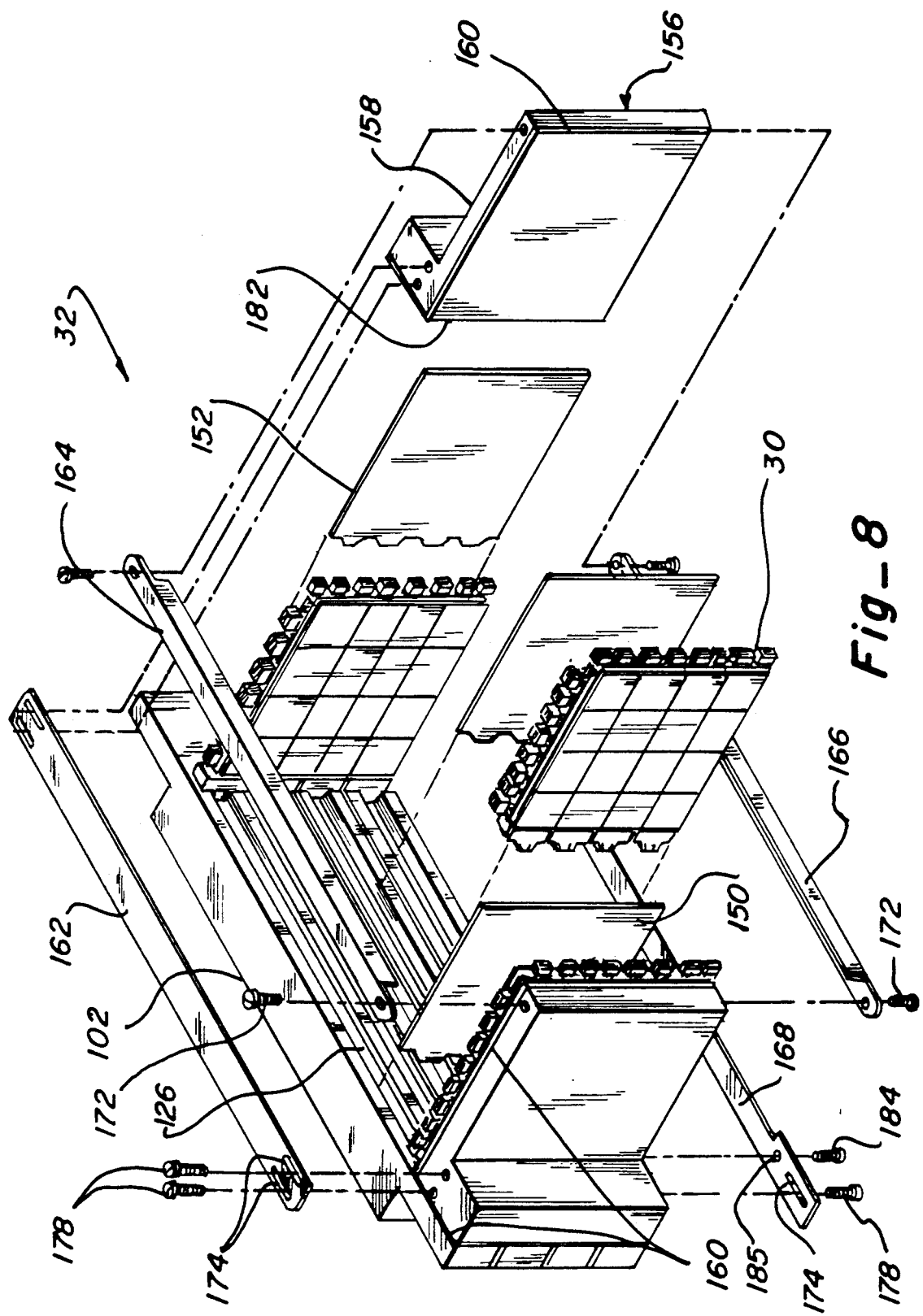

LOGIC MODULE ASSEMBLY FOR CONFINING AND DIRECTING THE FLOW OF COOLING FLUID

CROSS REFERENCE TO OTHER INVENTIONS

This application is a continuation-in-part of copending application Ser. No. 07/666,362, now U.S. Pat. No. 5,131,233, entitled "Gas-Liquid Forced Turbulence Cooling" filed Mar. 8, 1991, which is assigned to the assignee of the present invention. The disclosure of application Ser. No. 7/666,362 is incorporated herein by this reference.

BACKGROUND OF THE INVENTION

This invention relates to a new and improved assembly of electronic components in a module such as a logic module used in a computer. More particularly this invention relates to a module and an assembly of modules having a configuration adapted for confining and directing a flow of cooling fluid through the module and into contact with the electronic components, which is particularly useful in a cooling system utilizing a flow of forced turbulent gas-liquid cooling fluid in a computer system.

In electronic computers substantially all the electrical energy consumed by the computer is ultimately converted to heat. This heat must be removed at a rate equal to the rate at which electrical energy is converted into heat, otherwise the components of the computer will be destroyed by the accumulated heat. Furthermore, the cooling effect must be distributed appropriately to maintain all of the components of the computer within appropriate operating temperatures. Achieving adequate heat removal is of significant concern in all computer systems, but is of particular concern in high speed, high capacity digital computers, referred to hereinafter as supercomputers, which operate with relatively high heat generating densities, for example in the range of 275 watts per cubic inch.

Virtually all computers are cooled by heat transfer to a liquid fluid or a gas fluid flowing through or within the computer. To attain effective cooling it is important that the cooling fluid be effectively delivered to, and removed from, the components to be cooled.

An advantageous cooling technique for supercomputers, which combines a cooling gas and a cooling liquid in a turbulent flow to achieve improved cooling is described in detail in the aforementioned U.S. patent application Ser. No. 07/666,362, now U.S. Pat. No. 5,131,233. In the cooling system of this invention a plurality of the logic modules are installed in a sealed upper chamber of a computer housing. A lower chamber of the computer housing contains a power supply for the computer. A partition with an opening separates the upper chamber from the lower chamber. The opening is located directly below the logic modules. The logic modules include integrated circuits (ICs) attached to circuit boards and located along channels formed in the modules. The cooling liquid is sprayed into the upper chamber and a flow of gas pressurizes the upper chamber. A pressure differential between the upper and lower chambers combines the cooling gas and the sprayed droplets of liquid into a turbulent flow which travels through channels in the logic modules and through the opening in the partition to the lower chamber. Both the latent heat of vaporization and the sensible heat gain of the cooling fluids effectively remove heat from the ICs located along the channels. An enhanced cooling effect of the logic modules results. The enhanced cooling effect is particularly important because ICs in the logic modules are capable of generating higher heat densities and are more susceptible to damage from increased temperature than the power supply and other components of the computer.

A flow of cooling liquid or gas or both which passes from the upper chamber to the lower chamber without flowing through the channels of the logic modules is referred to as flow short circuiting.

To achieve the best cooling effect, it is desirable to direct substantially all of the turbulent flow of cooling gas and liquid through the channels of the logic modules. Cooling fluid which does not flow through the channels does not contact the heat generating components of the logic modules and does not contribute to cooling. Furthermore, gas and liquid which enters the channels at points other than the entrance or escapes from the channels without contacting the components in the channels can result in disturbing the proportions of the mixture of the gas and liquid to cause uneven and possibly inadequate cooling. In areas which experience excessive gas flow relative to the liquid flow, localized dry spots can develop where inadequate cooling may take place. In areas which experience excessive liquid flow relative to gas flow the advantages of turbulence in the cooling fluid are reduced leaving the primary cooling to be by less desirable immersion effects.

It is against this background that the present invention has evolved, to obtain even further significant improvements and advancements in the field of cooling supercomputers, general purpose computers, electronic components and other high density heat generating configurations.

SUMMARY OF THE INVENTION

One of the significant aspects of the present invention is obtaining a relatively uniform distribution of cooling gas and cooling liquid in a turbulent flow through the logic modules of a computer, to thereby reduce or eliminate localized dry spots. In accordance with this aspect of the invention, each logic module incorporates at least one new and improved power blade which mates with an improved power buss to provide a substantial seal against the entry of dry cooling gas into the channel and to reduce flow short circuiting while delivering high electric currents to the modules. Each power blade incorporates an integral leaf spring and a securing fastener to center the blade and provide an effective seal for the flow of cooling fluid through the channels of the module. Also, in accordance with this aspect of the invention, flow blockers are located between components of the module and cooperate with the power blades to direct the flow of cooling fluid through the channels and evenly over the components of the module. Flow short circuits between the module and the power buss are avoided and the entry of dry cooling gas into the flowing mixture of cooling fluids within the modules is avoided. The arrangement of the power blade and power buss and the flow blockers more effectively distributes the cooling fluid mixture throughout the channels of the logic modules.

Another significant aspect of the invention relates to an installation of the logic modules in the upper chamber of a computer system. An effective seal is formed to reduce or eliminate flow short circuiting between the upper and lower chambers. In accordance with this aspect of the invention a plurality of logic modules are assembled into a logic module cluster. Sealing plates are provided between adjacent modules and between modules and adjacent end caps of a supporting frame to prevent cooling fluid from flowing between and around modules in the cluster. A gasket seals the logic module cluster to the perimeter of the opening in the partition between the upper chamber and the lower chamber to prevent the flow of cooling fluid from entering the lower chamber without passing through the channels of the logic modules. All or a majority of the cooling liquid and gas pass through the channels of the logic modules, providing effective cooling of integrated circuits on the modules.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is an exploded perspective view of a portion or sector of a supercomputer illustrating an upper chamber containing two logic module clusters and a lower chamber containing a power supply for the supercomputer, and with respect to which a cooling system is operative for cooling the logic module clusters by a turbulent flow of a mixture of cooling gas and cooling liquid in the upper chamber and for cooling the power supply components by cooling liquid immersion cooling in the lower chamber.

FIG. 2 is an exploded perspective view of one of the logic modules of one of the logic module clusters shown in FIG. 1.

FIG. 3 is a partial section view of an assembled logic module taken substantially at line 3—3 in FIG. 2.

FIG. 4 is an exploded perspective view of a portion of the logic module shown in FIGS. 2 and 3 illustrating the flow blockers of the present invention.

FIG. 5 is a front perspective view of a power blade attached to the logic module shown in FIG. 2.

FIG. 6 is a rear perspective view of the power blade shown in FIG. 5.

FIG. 7 is an exploded section view of the logic module cluster taken substantially in the plane of line 7—7 of FIG. 1.

FIG. 8 is an exploded perspective view of one of the logic module clusters shown in FIG. 1.

DETAILED DESCRIPTION

The best mode presently known of practicing the improvements of the present invention is described in conjunction with a typical supercomputer 20 shown in FIG. 1. The supercomputer 20 is made up of a plurality of separate individual computing sectors 22, each of which is primarily contained within its own separate sealed housing 24. Each sealed housing 24 is divided into an upper chamber 26 and a lower chamber 28. A plurality of logic modules 30, each of which contains a plurality of functional logic or other integrated circuits (ICs) of the supercomputer 20, are mechanically and electrically assembled into two logic module clusters 32 and 33 of the present invention. Two logic module clusters 32 and 33 are shown but at least one cluster 32 or 33 is employed. The lower chamber 28 contains assemblies of the typical power supply components 34, such as transformers, rectifiers and filter capacitors, which convert standard electrical power to low voltage DC power suitable for powering the ICs in the upper chamber 26.

The upper chamber 26 is divided from the lower chamber 28 by a partition 36 in the sealed housing 24. The partition 36 has one opening 37 and 38 for each logic module cluster 32 and 33, respectively. Each logic module cluster 32 and 33 is installed in the upper chamber 26 with a bottom side 40 of each logic module cluster 32 and 33 located directly above the opening 37 and 38 corresponding to that logic module cluster.

Each logic module 30 of each logic module cluster 32 or 33 is preferably cooled by a turbulent flow of cooling gas and cooling liquid introduced into the upper chamber 26, as is described in greater detail in application Ser. No. 07/666,362. At least one, and preferably two, cooling fluid supply blocks 42 deliver cooling liquid and cooling gas to the upper chamber 26. Each fluid supply block 42 comprises a gas supply conduit 44 and a liquid supply conduit 46. The liquid supply conduit 46 extends higher above the partition 36 than does the logic module clusters 32 and 33. The liquid supply conduit 46 engages a matching port 50 of a nozzle manifold 52. Cooling liquid is supplied through the conduit 46 and port 50 into the nozzle manifold 52 and from there to a plurality of nozzles 54. The nozzles 54 spray droplets of the cooling liquid over a top side 56 of the logic module clusters 32 and 33.

The gas supply conduit 44 extends to a point between the partition 36 and the nozzle manifold 52. The gas supply conduit 44 opens into the upper chamber 26. Pressurized gas is forced into the upper chamber 26 of the sealed housing 24 through the gas supply conduit 44, pressurizing the upper chamber. Droplets of cooling liquid and cooling gas are forced through the channels and over the ICs of the logic modules 30 in a turbulent flow by the pressure and turbulent flow of the cooling gas. The turbulent flow of cooling gas and liquid partially or fully coats the ICs with a thin film of cooling liquid. Heat is removed by an advantageous effect of sensible heat gain and vaporization heat gain, as is described more completely in the previously mentioned application Ser. No. 07/666,362.

The structure and arrangement of the components of the logic modules 30 are more completely described in U.S. patent applications Ser. No. 07/053,142, filed May 21, 1987 now U.S. Pat. No. 5,054,192; Ser. No. 07/347,507, filed May 4, 1989 now U.S. Pat. No. 5,014,419; Ser. No. 07/386,290, filed Jul. 27, 1989 now U.S. Pat. No. 5,045,975; and Ser. No. 07/657,653, filed Feb. 15, 1991 now U.S. Pat. No. 5,112,232, all of which are assigned to the assignee of the present invention, and all of which are incorporated herein by this reference.

Those details of one logic module 30 which are generally important to an understanding of this invention are shown in FIG. 2. A plurality of ICs 62 are attached to each one of a plurality of circuit boards 64, preferably by lead wires as described more completely in the aforementioned applications. Two layers of circuit boards 64, comprising an inner generally planar layer 66 and an outer generally planar layer 68, are attached to one side of a planar logic plate 70. The logic plate 70 electrically interconnects and supports the circuit boards 64. Each circuit board 64 is oriented so that the ICs 62 are located facing towards the logic plate 70. An overlay sheet 72 is attached to each circuit board 64 that is located in the outer layer 68. One logic plate 70 is positioned against and on each opposite side of a planar power plate 74. The power plate 74 supports the logic plate 70 and conducts electrical power to the logic plates, the circuit boards 64 and the ICs 62. Each one of the circuit boards 64, logic plates 70 and power plate 74 is preferably formed as a printed circuit board.

As illustrated in FIG. 3 the ICs 62 attached to the circuit boards 64 of an outer layer 68, separate the circuit boards of the outer layer 68 from the circuit boards of an adjacent inner layer 66. Similarly, ICs 62 attached to the circuit boards 64 of the inner layer 66, separate the circuit boards of the inner layer 66 from an adjacent logic plate 70. As a result a channel 76 is formed between each outer layer 68 of circuit boards 64 and each adjacent inner layer 66 of circuit boards. An additional channel 77 is formed between each inner layer 66 of circuit boards 64 and each adjacent logic plate 70. The ICs 62 are thus positioned in the channels 76 or 77 and are in a heat communicating relationship with the channels. It is through these channels 76 and 77 that cooling fluids flow to remove heat from the ICs 62. The channels 76 and 77 extend from an open end at a top edge 84 (FIG. 2) of each logic module 30 at the top side 56 (FIG. 1) of each logic module cluster 32 and 33 to another open end at a bottom edge 80 (FIG. 2) of each logic module at the bottom side 40 (FIG. 1) of each cluster. A plurality of wire mats 81 and connectors 83 (FIG. 7) electrically connect the circuit boards 64 and ICs 62 of the logic module 30 to other components of the computer 10.

As shown in FIGS. 2 and 3 flow blockers 86 are located along a rear edge 82 of the logic module 30. The flow blockers 86 are positioned between each outer layer 68 of circuit boards 64 and each adjacent inner layer 66 of circuit boards and between each inner layer 66 of circuit boards and each adjacent logic plate 70. Each flow blocker 86 comprises an elongated adhesive-backed resilient rectangular insulating bar, preferably made of plastic. The flow blocker 86 has a thickness approximately equal to the spacing between adjacent layers 66 and 68 of circuit boards 64 or between the inner layer 66 of circuit boards and the adjacent logic plate 70, and has substantially the same length as an edge of a circuit board. In the preferred embodiment the flow blockers 86 are formed from Ultem TM sheet, manufactured by General Electric Company, with an adhesive Kapton TM backing, manufactured by DuPont.

The manner in which the flow blockers 86 are attached in the modules 30 is shown in FIG. 4. Each flow blocker 86 has a plurality of unplated holes 88 extending through it which are arranged to match and align with a plurality of corresponding holes 90, 92 and 94 of the logic plate 70, circuit boards 64 and overlay sheet 72, respectively, when the flow blockers 86 are properly positioned. The flow blockers 86 are adhesively attached to the side of the circuit boards 64 to which the ICs 62 are attached. The logic plate 70, circuit boards 64, overlay sheets 72, and flow blockers 86 are connected by insertion of a plurality of electrically conductive twisted wire jumper pins 96 through the aligned holes 88, 90, 92 and 94 when the logic modules 30 are assembled. Each twisted wire jumper pin 96 is inserted through an unplated hole 94 in an overlay sheet 72, through a plated or unplated hole 92 in a circuit board of the outer layer 68, through an unplated hole 88 in a flow blocker 86, through a plated or unplated hole 92 of a circuit board of the inner layer 66, through an unplated hole 88 of a flow blocker 86 and through a plated or unplated hole 90 of the logic plate 70. Thus the components are mechanically connected. The components with plated holes are electrically interconnected by the twisted wire jumper pins 96 where desired. More details concerning the twisted wire jumper pins and their use in electrically and mechanically connecting components in a logic module are found in U.S. patent application Ser. No. 07/347,507, now U.S. Pat. No. 5,014,419.

The flow blockers 86 form a boundary of the channels 76 and 77 at the rear edge 82 of the logic module 30 to reduce or eliminate the loss in cooling efficiency due to leakage of cooling gas and liquid into or out of the channels 76 and 77 (FIG. 3) at the rear edge 82 of the logic module 30 establishing a substantially continuous fluid directing boundary wall of the channel. By preventing leakage of dry cooling gas into the 76 and 77, dry spots in the channels 76 and 77 are reduced or eliminated. The small discontinuities 98 (FIG. 2) between the flow blockers 86 along each channel 76 or 77 (FIG. 3) of the logic modules 30 create small areas of minor leakage along the rear edge 82 of the logic module, but it has been found that these small discontinuities 98 have a minor effect on cooling efficiency, and are acceptable in the preferred embodiment.

Electrical power is delivered from the power supply equipment 34 in the lower chamber 28 to the logic modules 30 in the upper chamber 26 by a plurality of vertical power busses 100, shown in FIG. 1. Horizontal power busses 102 and 103 which direct the electrical power to the logic module clusters 32 and 33 respectively are detachably electrically and mechanically connected to the vertical busses 100. Power is conducted from the horizontal power busses 102 and 103 to each logic module 30 through at least one and preferably a plurality of power blades 104 (FIG. 2) which are electrically and mechanically connected to a front edge 78 of the logic module 30. The power blades 104 mate sealably with the horizontal buss 102 or 103, to convey electrical power from the busses to the logic module 30. The mating connection of the power blades and busses forms a seal to reduce or eliminate the flow of cooling gas and cooling liquid between the horizontal power buss 102 and 103 and the logic module 30.

The power blades 104 are described in more detail in conjunction with FIGS. 5 and 6. Each power blade 104 comprises a body portion 106 and a connector portion 108. The body portion 106 of the power blade 104 has an elongated rectangular configuration with a power plate receiving slot 110 formed therein. The power plate 74 of the logic module 30 is inserted in the slot 110 (FIGS. 3 and 5).

A plurality of connection holes 112 extend through the body portion 106 into the power plate receiving slot 110. The power plate 74 has a plurality of plated holes 120, arranged to match and align with the connection holes 112 in the body portion 106. A flexible conductive twisted wire jumper power pin 122 is inserted into each connection hole 112 from one side 114 of the body portion 106 through the connection hole 112 to an opposite side 118 of the body portion 106. The power pins 122 flexibly mechanically and electrically connect the power blades 104 to the power plate 74 and thus to the logic module 30. The slot 110 and the power pins 122 and the holes 112 are one example of a means for attaching the power blade 104 to the logic module 30.

The body portion 106 of the power blade 104 has a thickness that is substantially the same as the thickness of the logic module 30 as shown in FIG. 3. A rear surface 123 of the rectangular body portion abuts the forward edges of the logic plates 70 and circuit boards 64 of the layers 66 and 68 and seals the channels 76 and 77 forming a boundary of the channels 76 and 77 along the front edge 78 of the logic modules 30. The power blades 104 form a barrier to the flow of cooling fluid into and out of the channels 76 and 77 (FIG. 3) at the front edge 78 of the logic module 30 establishing a substantially continuous fluid directing boundary wall of the channel. As with the flow blockers 86, small discontinuities 122 (FIG. 2) between the power blades 104 of the preferred embodiment create small areas of minor leakage into and out of the channels 76 and 77 along the front edge 78 of the logic module 30 but it has been found that these small discontinuities have a minor effect on cooling efficiency, and are acceptable in the preferred embodiment.

The connector portion 108 of each power blade 104 has a trapezoidal configuration which extends forward from the body portion 106. The connector portion 108 has two tapered sides 127 which are tapered in a forwardly and inwardly converging direction. The two tapered sides 127 are generally similar in the degree of taper of a corresponding receptacle 126 (FIG. 7) of each horizontal power buss 102 or 103 (FIG. 7), as described below. A slot 128 is formed in the connector portion 108 generally parallel to each of the tapered sides 127 of the connector portion. The two slots 128 create two centering springs 130 at the sides 127. Each centering spring 130 is a cantilever leaf spring bounded on one side by a tapered side 127 and on another, opposite side by a slot 128. Each centering spring 130 is operative from a juncture 131 of the connector portion 108 and the body portion 106 of the power blade 104. The cantilever spring effect is achieved by the resiliency of the material from which the connector portion 108 of the power blade 104 is formed.

In the preferred embodiment the power blade 104 is machined out of a single block of electrically conductive metal, such as hard drawn CDA 110 copper bar. The material of the power blade 104 is plated with nickel and then plated with gold over the nickel plating. The gold plating provides a high conductivity contact surface and the nickel plating serves as a barrier to diffusion of gold electrons into the copper.

Details of the horizontal power buss 102 to which the power blades connect are described in conjunction with FIG. 7. Each horizontal power buss 102 and 103 comprises at least one, and preferably a plurality, of elongated rectangular buss bars 134, each with a cross sectional area adequate to conduct the current to be conducted to the power blades 104 of all of the attached logic modules 30. The buss bars 134 are stacked vertically with an insulating layer 136, preferably epoxy, between adjacent buss bars 134. Each buss bar 134 has a securing surface 137 at which the horizontal buss 102 and 103 is connected to the vertical buss 100, and a connection surface 138 to which the power blades 104 are connected. At least one receptacle 126 is machined into each connection surface 138 and extends along substantially the entire length of the connection surface 138. Each receptacle 126 has a trapezoidal shaped cross sectional configuration with two opposite rearwardly converging surfaces 142 forming a taper which converges slightly more sharply than the taper of the sides 127 of the centering springs 130 of the power blade 104. The horizontal buss bars 134 are manufactured from material having physical characteristics and plating similar to that of the power blades 104.

A securing bolt 146 secures and retains each power blade 104 to one of the receptacles 126 formed in the horizontal busses 102 and 103. A threaded securing hole 132 extends through the connector portion 108 and body portion 106 of the power blade 104 at the center of the power blade. An elongated slot 144 extends through the power busses 102 and 103 from the securing surface 137 to the connection surface 138. The slot 144 extends substantially along the length of the receptacle 126. The securing bolt 14 is inserted through the slot 144 and threaded into the securing hole 132. When the securing bolt is tightened the power blade is drawn into a secure mechanical and electrical connection with the power buss 102 or 103. As the connector portions 108 are drawn into the receptacles 126 the tapered sides 127 of the connector portions contact the converging surfaces 142 of the receptacles. The pressure of the contact between the tapered sides 127 and converging surfaces 142 causes the centering springs 130 to deflect toward the centers of the power blades 104. Because the centering springs 130 have symmetrical geometry, they will tend to equalize the forces on the two sides of each connector portion 108 by centering the connector portion in the receptacle 126. The flexible twisted wire jumper power pins 122 allow the power blades 104 to shift slightly in relationship to the power plate 74 in response to the centering action of the centering springs 130 of the connector portion 108 in the receptacle 126. This shifting beneficially compensates for manufacturing tolerances in the power blades 104, logic plate 74 and horizontal power buss 102 and 103, and allows the sealing engagement to be more readily achieved.

In addition to centering the connector portions 108 in the receptacles 126, to achieve a better fluid tight seal, the pressure applied by the centering springs 130 on the converging surface 142 of the receptacles establishes a positive electrical and mechanical connection between each power blade 104 and the corresponding buss bar 134 of the horizontal power buss 102 or 103. The connection is characterized by accurate alignment and a relatively large area of electrical and mechanical contact. The connection thus made assures a reliable high current capacity electrical connection and a relatively fluid-tight mechanical connection.

A presently preferred embodiment of the logic module cluster 32 of the present invention is illustrated in FIG. 8. The logic module cluster 32 comprises a plurality of logic modules 30 and a plurality of resilient dielectric intermediate sealing plates 150 and at least two end sealing plates 152. In the logic module cluster 32 shown in FIG. 8, three logic modules 30 are illustrated. Of course, a logic module cluster 32 may comprise more or less than the three logic modules 30 illustrated. The cluster 32 is assembled in a supporting frame 156 with intermediate sealing plates 150 located between adjacent logic modules. At least one end sealing plate 152 is located at each end of the assembled logic modules 30.

Each sealing plate 150 and 152 comprises a thin sheet of resilient dielectric material. Each intermediate sealing plate 150 has a thickness and resilience sufficient to conform to the surfaces of two adjacent logic modules 30 and to provide a fluid-tight seal between the overlays 7 (FIG. 2) of the adjacent logic modules 30 when slightly compressed. Each end sealing plate 152 has a thickness and resilience sufficient to conform to the surfaces of a logic module 30 and to provide a fluid-tight seal between the overlays 72 (FIG. 2) of the logic modules 30 at each end of the cluster 32 and an adjacent end cap 158 of the supporting frame 156. Each sealing plate 150 and 152 has a profile shape and size substantially identical, or conforming, to a profile shape and size of the logic modules 30, including the connector portions 108 of the power blades 104 as shown in FIG. 7. The intermediate sealing plates 150 are Ultem TM in the preferred embodiment and the end sealing plates 152 are Poron TM manufactured by Rogers Corporation, Poron Materials Division, East Woodstock, Conn., or Volara TM manufactured by Voltek, a Division of Sekisui Americoa Corporation, Lawrence, Mass.

The supporting frame 156 holds the assembled logic modules 30 and sealing plates 150 and 152 together in a generally parallel relationship and creates a substantially rigid assembly. Each end cap 158 has a generally rectangular configuration with a profile shape similar to the profile shape of the logic module 30 shown in FIG. 7, but without the power blades 104 and a profile size slightly larger than the profile size a logic module 30. An overlay 160, preferably epoxy, insulates the end cap from the logic modules 130 and the horizontal power buss 102.

A top front strut 162, a top rear strut 164, a bottom rear strut 166 and a bottom front strut 168 are mechanically connected to the end caps 158 forming the supporting frame 156 to confine and support the logic modules 30 and sealing plates 150 and 152. Each strut 162, 164, 166, 168 is elongated and extends generally perpendicular to each end cap 158. Each corner of each logic module 30 engages and is supported by one strut 162, 164, 166, or 168 of the supporting frame 156. The end caps and struts are preferably fabricated of anodized aluminum.

The top rear strut 164 and bottom rear strut 166 each have an L-shaped cross section. The top and bottom rear struts 164 and 166 are connected to the rear of each end cap 158 at each end of each strut by a single fastener or bolt 172.

The top front strut 162 and bottom front strut 168 each have generally rectangular cross sections and include at least one elongated attachment slot 174 near each end of each strut. Each slot 174 is elongated in a direction parallel to the strut. The top and bottom front struts 162, 168 are connected to the front of each end cap 158 at each end by at least one fastener or bolt 178. The slots 174 allow front edges 182 of the end caps 158 to be moved slightly toward and away from each other along slidable connections formed by the slots 174 and fasteners 178, while the end caps 158 rotate slightly about rotatable connections formed by the fasteners 172 at the rear struts 164 and 166.

To assemble the logic module cluster 32, the front edges 182 of the end caps 158 of the supporting frame 156 are moved to a furthest apart or open position by sliding the fasteners 178 to the outer ends of the slots 174. The logic modules 30 and sealing plates 150, 152 are then assembled into the supporting frame 156. The power blades 104 of the logic modules 30 are positioned at the front of the supporting frame and protrude beyond the front edges 182 of the end caps 158. The number of end sealing plates 152 between an end cap 158 and an adjacent logic module 30 is adjusted as necessary to fill the space of the supporting frame 156. The number and thickness of the logic modules 30 and sealing plates 150 and 152 cause a slight compression of the sealing plates at a rear side of the logic module cluster 32 and 33 by insertion of the logic modules 30 and sealing plates 150 and 152 into the supporting frame.

After all of the logic modules and sealing plates are assembled in the supporting frame 156, the front edges 182 of the end caps 158 are moved towards each other. The movement of the front edges 182 of the end caps 158 towards each other compresses the sealing plates 150 and 152 over substantially their full surface. The front strut 168 has a locking hole 185 near each end. A locking fastener 184 extends through the locking hole 185 and mechanically attaches each end of the front strut 168 to the front of each end cap. The connection made by the locking fastener 184 prevents movement of the front edges 182 of the end caps 158 away from each other and locks the end caps 158 into a position with the sealing plates 150 and 152 relatively uniformly compressed.

The compressed sealing plates 150 and 152 form a relatively fluid-tight seal between each logic module 30 and each adjacent logic module or end cap 158. Cooling fluid impinging on the top side 56 (FIG. 1) of the logic module cluster 32 and 33 is impeded from flowing around and between the logic modules 30 and is directed through the channels 76 and 77 (FIG. 3) of the logic modules 30 In this manner flow short circuiting from the upper chamber 26 (FIG. 1) to the lower chamber 28 (FIG. 1) between adjacent logic modules 30 and between logic modules 30 and adjacent end caps 158 of the logic module cluster 32 and 33 is reduced or eliminated.

After the logic modules 30 and sealing plates 150 and 152 are assembled into the supporting frame 156 to form the logic module cluster, the power buss 102 or 103 connected to the logic modules outside the housing 24 (FIG. 1) of the computer 20 (FIG. 1). Connecting the logic module cluster to the horizontal power buss makes assembly easier and improves access to the components. The installation of each logic module clusters 32 and 33 and the connected horizontal buss 102 and 103 in the upper chamber 26 then proceeds, as is appreciated from FIG. 1.

A resilient assembly gasket 186 is affixed to the partition 36 and surrounds each opening 37 and 38. The bottom side 40 of each logic module cluster sealably engages the assembly gasket 186 at the horizontal power buss 102 or 103, two end caps 158 (FIG. 2), and the bottom rear strut 166. Each assembly gasket 186 is compressed by the bottom side 40 of the logic module cluster to form a relatively fluid-tight seal. The horizontal power buss 102 or 103 is then electrically and mechanically connected by a plurality of bolts 188 to at least one of the vertical power busses 100. Each logic module cluster is thus secured in the upper compartment 26 by the connection between the vertical buss 100 and the horizontal buss 102 or 103. A relatively fluid-tight seal is provided by the compressed gasket, which prevents the flow of cooling liquid and gas around a perimeter of the logic module cluster. Flow short circuiting from the upper chamber 26 to the lower chamber 28 around the perimeter of logic module cluster 32 and 33 is thereby reduced or eliminated.

The new and improved logic module and logic module cluster which has been described advantageously improves cooling of the ICs of a supercomputer or other electronic assembly. The entry of cooling fluid into the channels of the logic modules is substantially limited to the top side of the logic module cluster upon which cooling liquid is sprayed. Dry cooling gas is substantially excluded from entering the sides of the logic module cluster not exposed to the spray of cooling liquid, producing a relatively uniform distribution of gas and liquid flow through the channels and reducing or eliminating dry spots within the channels. The flow of cooling fluids is confined to, and directed through the channels of the logic module, bringing the cooling fluids in intimate contact with the ICs of the logic module.

Flow short circuiting of cooling fluids from the upper chamber to the lower chamber around the logic module cluster and between logic modules is reduced or eliminated, so that all or a majority of the flow of cooling fluids passes through the channels of the logic module.

Electrical energy is delivered to the IC's of the logic modules reliably and efficiently by the power blades and the horizontal buss which cooperate with the rest of the logic module cluster to maintain the integrity of the channel and of the seal between the upper chamber and the lower chamber.

A presently preferred embodiment of the present invention and many of its improvements have been described with a degree of particularity. It should be understood that this description has been made by way of preferred example, and that the invention is defined by the scope of the following claims.

The invention claimed is:

1. An electronic computer comprising at least one electronic circuit module having a plurality of relatively closely spaced apart heat generating integrated circuits (ICs) positioned in a direct heat communicating relationship with an elongated interior channel, the channel extending within the module from one open end at one edge of the module to another opposite open end at another edge of the module, said electronic computer further comprising means for flowing a cooling fluid through the channel to cool the ICs; and an improvement in combination therewith comprising:

at least one power blade attached at an edge of the module, each power blade providing electrical contact to the module, each power blade of the module defining a first substantially continuous fluid directing boundary wall which extends the entire length of the channel from the one open end to the other open end;

at least one elongated flow blocker sealably attached at another edge of the module, each flow blocker of the module defining a second substantially continuous fluid directing boundary wall which extends the entire length of the channel from the one open end to the other open end, the second boundary wall being on the opposite side of the channel from the first boundary wall; and the module and each power blade and each flow blocker establishing a substantially closed and continuous fluid directing path of the channel between the one open end and the opposite open end to confine the flow of cooling fluid within the module through the channel.

2. An electronic computer as defined in claim 1 wherein the module further includes at least one printed circuit board to which the ICs are attached and along which the channel extends, and wherein:

each power blade is attached to the module at a position adjacent to an edge of the printed circuit board to substantially define the first substantially continuous fluid directing boundary wall of the channel adjacent to the edge of the printed circuit board.

3. An electronic computer as defined in claim 2 wherein:

the printed circuit board substantially defines a portion of the substantially closed and continuous fluid directing path of the channel.

4. An electronic computer as defined in claim 1 wherein the module further includes at least one printed circuit board to which the ICs are attached and along which the channel extends, and wherein:

each flow blocker is attached to the module adjacent an edge of the printed circuit board to substantially define the second substantially continuous fluid directing boundary wall of the channel.

5. An electronic computer as defined in claim 1 wherein the module further includes at least two printed circuit boards arranged in layers with the ICs connected to the printed circuit boards and with the channel extending between the layers of printed circuit boards, and wherein:

each power blade contacts the adjacent layers of the printed circuit boards to define the first substantially continuous fluid directing boundary wall of the channel between the layers of printed circuit boards; and each flow blocker is sealably attached between layers of the printed circuit boards to define the second substantially continuous fluid directing boundary wall of the channel.

6. An electronic computer as defined in claim 1 further including a power buss operative to conduct electrical power to the module, and wherein:

at least one of the power blades includes connector means for mating with the power buss and conducting electric power from the power buss to the module, the connector means further substantially impeding the flow of cooling fluid around the power blade at the power buss.

7. An electronic computer as defined in claim 6 wherein:

the power buss further comprises an elongated slot receptacle extending substantially along the power buss; and the connector means includes a connector portion of the power blade extending away from the edge of the module to which the power blade is attached, and centering means for centering the connector portion in the slot receptacle; and further comprising:

means for mechanically securing the connector portion into the receptacle.

8. An electronic computer as defined in claim 7 wherein:

the connector portion is generally trapezoidally shaped with a pair of tapered sides converging toward one another;

the centering means includes a spring at each tapered side operative to resiliently resist deflection of the tapered sides toward one another; and the slot receptacle has a generally trapezoidal cross section shape similar to the shape of the connector portion of the power blade.

9. An electronic computer as defined in claim 8 wherein:

the spring of the centering means includes a cantilever spring attached to the connector portion.

10. An electronic computer as defined in claim 8 wherein:

the spring of the centering means includes a cantilever spring portion of the connector portion, the cantilever spring portion formed at one tapered side by a slot formed in the connector portion extending generally parallel to the tapered side of the connector portion.

11. An electronic computer as defined in claim 10 wherein:
the spring of the centering means includes two cantilever spring portions located at each of both tapered sides of the connector portion.

12. An electronic computer as defined in claim 11 wherein:
the generally trapezoidal cross section shape of the slot receptacle is defined by two converging surfaces which converge to a greater extent than the tapered sides of the trapezoidal shaped connector portion converge to deflect the cantilever spring portions of the connector portion.

13. An electronic computer as defined in claim 1 having at least two modules, and further comprising:
a supporting frame for holding the modules together in a generally parallel relationship in a cluster; and
an intermediate sealing plate positioned between the modules to create a substantial impediment to the flow of cooling fluid between the modules and to confine the flow of cooling fluid to the channels within the modules.

14. An electronic computer as defined in claim 13 wherein:
each sealing plate comprises resilient material, and the sealing plate is compressed between the modules.

15. An electronic computer as defined in claim 13:
wherein the supporting frame comprises two end caps positioned adjacent to and opposite sides of the two generally parallel modules; and
further comprising at least one end sealing plate positioned between each end cap and an adjacent module.

16. An electronic computer as defined in claim 15 wherein:
each sealing plate comprises resilient material;
the intermediate and end sealing plates are compressed to form a seal between the two modules and the module and an end cap, respectively; and
the supporting frame holds the modules in the cluster with the sealing plates compressed.

17. An electronic computer as defined in claim 1 including an upper chamber in which the module is located, a lower chamber in which power supply equipment is located, and a partition separating the upper chamber from the lower chamber, the partition having an opening over which the module is located and with which the channel communicates through one open end in the module, and power buss means located in the upper chamber and connected to the power supply equipment by which to supply power to the power blade of the module.

18. An electronic computer as defined in claim 17 wherein the power buss means further comprises:
at least one vertical power buss extending from the lower chamber into the upper chamber; and
a horizontal power buss connected to a vertical power buss and comprising a receptacle for receiving a portion of the power blade.

19. An electronic computer as defined in claim 18 wherein:

the horizontal power buss comprises at least two elongated electrically conductive buss bars each having a slot receptacle formed therein and extending therealong and the both of which are oriented generally parallel to one another; and
a layer of insulation between the parallel buss bars.

20. An electronic computer as defined in claim 19 further comprising:
securing means operative between the buss bar and the power blade to draw a portion of the power blade into the slot receptacle of the buss bar and to mechanically secure the power blade to the buss bar.

21. An electronic computer as defined in claim 20 wherein the securing means further comprises:
a threaded securing hole into the power blade;
a securing slot through the buss bar extending from the slot receptacle; and
a threaded bolt inserted through the securing slot and threaded into the securing hole of the power blade.

22. An electronic computer comprising at least two electronic circuit modules, each module comprising a plurality of printed circuit boards arranged in at least two adjacent layers with an elongated interior channel between the layers and a plurality of relatively closely spaced apart heat generating integrated circuits (ICs) connected to at least one printed circuit board within the interior channel, the channel extending within each module from one open end at one edge of the module to another opposite open end at another edge of the module, said electronic computer further comprising means for flowing a cooling fluid through each channel to cool the ICs of each module; and an improvement in combination therewith comprising:
means defining first and second substantially continuous fluid directing boundary walls of the channel within each module, the boundary wall defining means being attached to each module adjacent to oppositely disposed edge portions of the printed circuit boards of each module and defining substantially continuous fluid directing boundary walls which extend the entire length of each channel in each module from the one open end to the other open end, the boundary wall defining means and the adjacent layers of printed circuit boards of each module further establishing a substantially closed and continuous fluid directing path of the channel between the one open end and the opposite open end of each module to confine the flow of cooling fluid within each module through the channel;
a supporting frame holding the modules in a generally parallel relationship; and
a module sealing plate positioned between each module and each adjacent module to create a substantial impediment to the flow of cooling fluid between adjacent modules and to confine the flow of cooling fluid to the channels within the modules.

23. An electronic computer as defined in claim 22:
wherein the supporting frame comprises two end caps between which the modules are positioned; and
further comprising at least one end sealing plate positioned between each one of the two end caps and an adjacent module.

24. An electronic computer as defined in claim 23 wherein:
each of the sealing plates is compressible; and the supporting frame is further operative to force the end caps toward one another to compress the sealing plates against the modules and form a relatively fluid tight seal therebetween.

25. An electronic computer as defined in claim 24 wherein the supporting frame further comprises:
a plurality of support struts interconnecting the two end caps and allowing relative movement between the two end caps to an open position at which the sealing plates do not form the relatively fluid-tight seal and a closed position at which the sealing plates form the relatively fluid tight seal.

26. An electronic computer as defined in claim 26 wherein the supporting frame further comprises:
two elongated L-shaped rear struts, having two legs, each rear strut rotatably connected at each end to a corresponding one of the end caps, wherein one leg of each strut engages and supports a rear edge of each module and the other leg of each rear strut engages and supports one of a top or a bottom edge of each module;
two elongated rectangular front struts, each strut slidably connected at each end to a corresponding one of the end caps, the connection being slidable in a direction parallel to the length of the front struts, wherein one strut engages and supports the top edge of each module and the other strut engages and supports the bottom edge of each module, the supporting frame being at the open position when the end caps are moved to a relatively further apart location along the slidable connection and at the closed position when the end caps are moved to a relatively closer together position along the slidable connection; and
a frame locking means operative to hold the supporting frame at the closed position.

27. An electronic computer as defined in claim 23 wherein:
each module sealing plate and each end sealing plate has a profile conforming to a profile of the modules.

28. An electronic computer as defined in claim 22 wherein:
each module further comprises at least one power blade attached to a front edge of the and operative for conducting electric power to the module; and
a horizontal power buss which is electrically and mechanically connected to each power blade and which is operative for conducting electrical power to each power blade.

29. An electronic computer comprising at least one electronic circuit module comprising at least one power plate to which at least one printed circuit board having integrated circuits is attached, an improvement in combination therewith comprising:
a power blade comprising an elongated rectangular body portion defining a first substantially continuous fluid directing boundary wall, the body portion electrically and mechanically attached in the module adjacent a front edge of the power plate, and a connector portion extending in a forward direction from the rectangular body portion, the connector portion having a trapezoidal configuration defined by two connector sides which converge toward one another in the forward direction, and a centering spring at each connector side;
an elongated electrically conductive buss bar having a rear surface and an opposite front surface, the buss bar having an elongated receptacle extending along the rear surface thereof, the receptacle having two receptacle surfaces which converge toward one another in the forward direction; and
securing means to draw the connector portion of the power blade into the receptacle of the buss bar and to mechanically secure the power blade to the power buss, the centering spring at each connector side centering the connector portion relative to the receptacle as the connector portion moves into the receptacle.

30. An electronic computer as defined in claim 29 wherein:
the amount of convergance of the two surfaces of the buss bar is slightly greater than the amount of convergence of the connector sides of the connector portion to deflect the centering springs of the connector portion when the power blade is drawn into the slot.

31. An electronic computer as defined in claim 30 wherein each centering spring further comprises:
a cantilever leaf spring.

32. An electronic computer as defined in claim 31 wherein each cantilever leaf spring is formed in part by a slot formed in the connector portion generally parallel to each tapered connector side of the connector portion and extending substantially to a juncture of the connector portion with the rectangular body portion.

33. An electronic computer as defined in claim 31 wherein the securing means further comprises:
a hole extending from a forward edge of the connector portion rearwardly into the connector portion;
an opening formed through the buss bar from the forward surface of the buss bar to the forward surface of the receptacle; and
a fastener extending through the opening and retained in the hole.

34. An electronic computer as defined in claim 31 wherein:
the rectangular and connector portions of the power blade are integrally formed from a single piece of conductive metal.

35. An electronic apparatus comprising:
at least one electronic circuit module, each module including two generally parallel and spaced apart substrates having a plurality of circuit elements electrically disposed therebetween, said substrates defining a first pair of opposing channel walls for directing a cooling fluid therebetween;
means providing electrical contact to said circuit elements which is affixed to the module adjacent to one edge portion of at least one of said substrates, said electrical contact providing means including a body portion thereof defining a first substantially continuous fluid directing boundary wall between said substrates; and
means for blocking fluid flow which is affixed to the module adjacent another oppositely disposed edge portion of at least one of said substrates, said fluid flow blocking means defining a second substantially continuous fluid directing boundary wall between said substrates,
said channel walls in conjunction with said boundary walls establishing a substantially closed and continuous fluid directing path for the channel between one open end and an opposite open end of the channel through said module for conduction of a cooling fluid to said circuit elements, the body portion of the electrical contact providing means and the fluid flow blocking means extending substantially continuously along the entire length of the first and second boundary walls, respectively.

36. An electronic computer comprising:

a plurality of modules, each of said modules including two generally parallel and spaced apart substrates having a plurality of circuit elements electrically disposed therebetween, said substrates defining a first pair of opposing channel walls for directing a cooling fluid therebetween;

means providing electrical contact to said circuit elements which is affixed to each module adjacent to one edge portion of at least one of said substrates, said electrical contact providing means including a body portion thereof defining a first substantially continuous fluid directing boundary wall between said substrates;

means for blocking fluid flow which is affixed to each module adjacent to another oppositely disposed edge portion of at least one of said substrates, said fluid flow blocking means defining a second substantially continuous fluid directing boundary wall between said substrates, said channel walls in conjunction with said boundary walls establishing in each module a substantially closed and continuous fluid directing path of the channel between one open end and an opposite open end of the channel for conduction of a cooling fluid to said circuit elements, the body portion of the electrical contact providing means and the fluid flow blocking means extending substantially continuously along the entire length of the first and second boundary walls, respectively;

a supporting frame holding said modules in a generally parallel relationship therebetween; and a module sealing plate positioned between each module and each adjacent logic module to create substantial impediment to flow of said cooling fluid and operative to substantially confine said cooling fluid flow to said fluid directing channel within said modules.

* * * * *